(12) United States Patent
Indukuru et al.

(10) Patent No.: US 9,405,548 B2
(45) Date of Patent: Aug. 2, 2016

(54) PRIORITIZING INSTRUCTIONS BASED ON THE NUMBER OF DELAY CYCLES

(75) Inventors: Venkat R Indukuru, Austin, TX (US); Alexander E Mericas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 643 days.

(21) Appl. No.: 13/314,052

(22) Filed: Dec. 7, 2011

(65) Prior Publication Data

US 2013/0151816 A1 Jun. 13, 2013

(51) Int. Cl.
*G06F 9/38* (2006.01)
(52) U.S. Cl.
CPC ............ *G06F 9/3853* (2013.01); *G06F 9/3836* (2013.01); *G06F 9/3857* (2013.01)
(58) Field of Classification Search
CPC .............................. G06F 9/3853; G06F 9/3836
USPC ........................................................ 712/215
See application file for complete search history.

(56) References Cited

U.S. PATENT DOCUMENTS

| 5,751,945 | A | * | 5/1998 | Levine et al. | 714/47.2 |
| 5,987,598 | A | * | 11/1999 | Levine et al. | 712/227 |
| 6,009,514 | A | | 12/1999 | Henzinger et al. | |
| 6,016,542 | A | | 1/2000 | Gottlieb et al. | |
| 7,865,702 | B2 | | 1/2011 | Suba | |
| 2002/0104032 | A1 | * | 8/2002 | Khurshid et al. | 713/322 |
| 2004/0158694 | A1 | | 8/2004 | Tomazin et al. | |
| 2007/0245110 | A1 | * | 10/2007 | Shibayama et al. | 711/165 |
| 2009/0259830 | A1 | * | 10/2009 | Indukuru et al. | 712/227 |
| 2009/0271592 | A1 | * | 10/2009 | Jensen | 712/214 |
| 2010/0077185 | A1 | * | 3/2010 | Gopalan et al. | 712/220 |
| 2010/0115168 | A1 | * | 5/2010 | Bekooij | 710/244 |

OTHER PUBLICATIONS

Processor Register, Nov. 14, 2010, Wikipedia, pp. 1-3.*
Brinkley Sprunt, The Basics of Performance-Monitoring Hardware, Jul.-Aug. 2002, 8 pages, Micro, IEEE, 22 (4), pp. 64-71.

* cited by examiner

*Primary Examiner* — Andrew Caldwell
*Assistant Examiner* — Jyoti Mehta
(74) *Attorney, Agent, or Firm* — Eustace P. Isidore; Yudell Isidore PLLC

(57) ABSTRACT

Methods, systems, and computer program products may provide delay-identification in data processing systems. An apparatus may include a delay-identification unit having a delay counter, a threshold register, a delay register, and a delay detector. The delay detector may be configured to start the delay counter in response to detecting that one group of instructions is delayed, and stop the delay counter in response to detecting that the one group of instructions is no longer delayed. The delay detector may additionally be configured to compare the number of cycles counted by the delay counter with a threshold number of cycles in the threshold register, and store at least one effective address of one of the instructions of the one group of instructions when the number of cycles counted by the delay counter is greater than the threshold number of cycles stored in the threshold register.

17 Claims, 6 Drawing Sheets

PRIORITIZING INSTRUCTIONS BASED ON THE NUMBER OF DELAY CYCLES

BACKGROUND

The present inventions relate generally to data processing systems, and more specifically, to data processing systems having a capability to identify executional delays (such as stall conditions), and record information regarding those delays.

Data processing systems, such as systems with superscalar and pipelined processors, may experience "stall conditions" or "stalls," which are events that delay the completion of one or more instructions by a clock cycle or more. Stalls may generally be classified into "front-end stalls" and "back-end stalls." Front-end stalls may include stalls that cause the pipeline to be empty such that instructions cannot be dispatched into the pipeline. Examples of front-end stalls include I-cache misses, branch mispredicts, instruction effective-to-real address translation (ERAT) misses, Simultaneous Multi-Threading (SMT) effects, etc. Back-end stalls may include stalls that involve instructions in the pipeline but the oldest group of instructions is not completing. Examples of back-end stalls include data cache misses, rejects, flushes, and long latency operations, such as fixed-point divide, etc.

BRIEF SUMMARY

According to one embodiment, an apparatus may include an instruction-grouping unit configured to organize a plurality of instructions for a computer processor into groups of instructions prior to execution. The apparatus may additionally include a plurality of execution units configured to execute the groups of instructions based upon cycles of a clock signal. The apparatus may further include delay-identification unit. The delay-identification unit may include a delay counter configured to count the cycles occurring in a time period between when one of the groups of instructions is ready to be dispatched for execution by one or more execution units of the plurality of execution units, and when the one group of instructions is completely executed by the one or more execution units.

The delay-identification unit may additionally include a threshold register configured to store a threshold number of cycles that represents an undesired amount of delay in a time period between when any of the groups of instructions is ready to be dispatched for execution by the one or more execution units, and when the any of the groups of instructions is completely executed by the one or more execution units. The delay-identification unit may further include a delay register configured to store at least one effective address of one of the instructions in one of the groups of instructions that is being executed. The delay-identification unit may additionally include a delay detector configured to detect when the one group of instructions is delayed in a time period between when the one group of instructions is ready to be dispatched for execution by the one or more execution units, and when the one group of instructions is completely executed by the one or more execution units.

The delay detector may be further configured to start the delay counter in response to detecting that the one group of instructions is delayed, and stop the delay counter in response to detecting that the one group of instructions is no longer delayed. The delay detector may additionally be configured to compare the number of cycles counted by the delay counter with the threshold number of cycles in the threshold register, and store at least one effective address of one of the instructions of the one group of instructions when the number of cycles counted by the delay counter is greater than the threshold number of cycles stored in the threshold register.

According to one embodiment, a method may include counting, by a delay-identifying apparatus, a number of cycles of a clock signal between (i) when a group of instructions is delayed in a time period between when the group of instructions is ready to be dispatched for execution by one or more execution units, and when the group of instructions is completely executed by the one or more execution units and (ii) when the group of instructions is no longer delayed in the time period. The method may additionally include comparing, by the delay-identifying apparatus, the counted number of cycles with a threshold number of cycles. The method may further include storing, in memory, an effective address of each of at least one instruction of the group of instructions when the counted number of cycles is greater than the threshold number of cycles.

According to one embodiment, a computer program product for identifying delays in a first computer processor may include at least one computer readable storage medium having first computer readable program instructions embodied therewith. The first computer readable program instructions, when executed by a second computer processor, may be configured to count, by the second computer processor, a number of cycles of a clock signal between (i) when a group of monitored program instructions is delayed in a time period between when the group of monitored program instructions is ready to be dispatched for execution by one or more execution units, and when the group of monitored program instructions is completely executed by the one or more execution units and (ii) when the group of monitored program instructions is no longer delayed in the time period. The first computer readable program instructions, when executed by a second computer processor, may be additionally configured to compare, by the second computer processor, the counted number of cycles with a threshold number of cycles. The first computer readable program instructions, when executed by a second computer processor, may be further configured to store, in memory, an effective address of one or more instructions of the delayed group of instructions when the counted number of cycles is greater than the threshold number of cycles.

Any of the above embodiments may be embodied as computer-based methods, systems, or program products.

DETAILED DESCRIPTION

Figure 1:
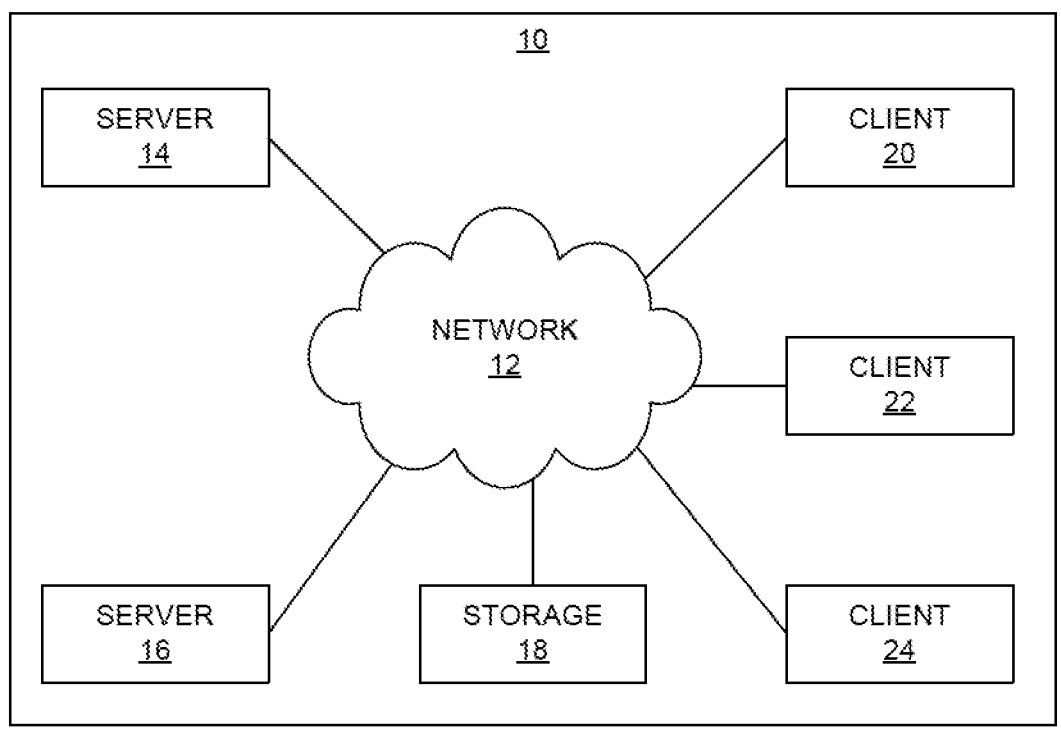
FIG. 1 is a pictorial representation of an example of a computer system in which illustrative embodiments may be implemented.

As will be appreciated by one skilled in the art, aspects of the present inventions may be embodied as a system, method or computer program product. Accordingly, aspects of the present inventions may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventions may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventions may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventions are described below with reference to flowchart illustrations and/or block diagrams of methods, apparatus (systems) and computer program products according to embodiments of the inventions. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions/acts specified in the flowchart and/or block diagram block or blocks.

Figure 2:
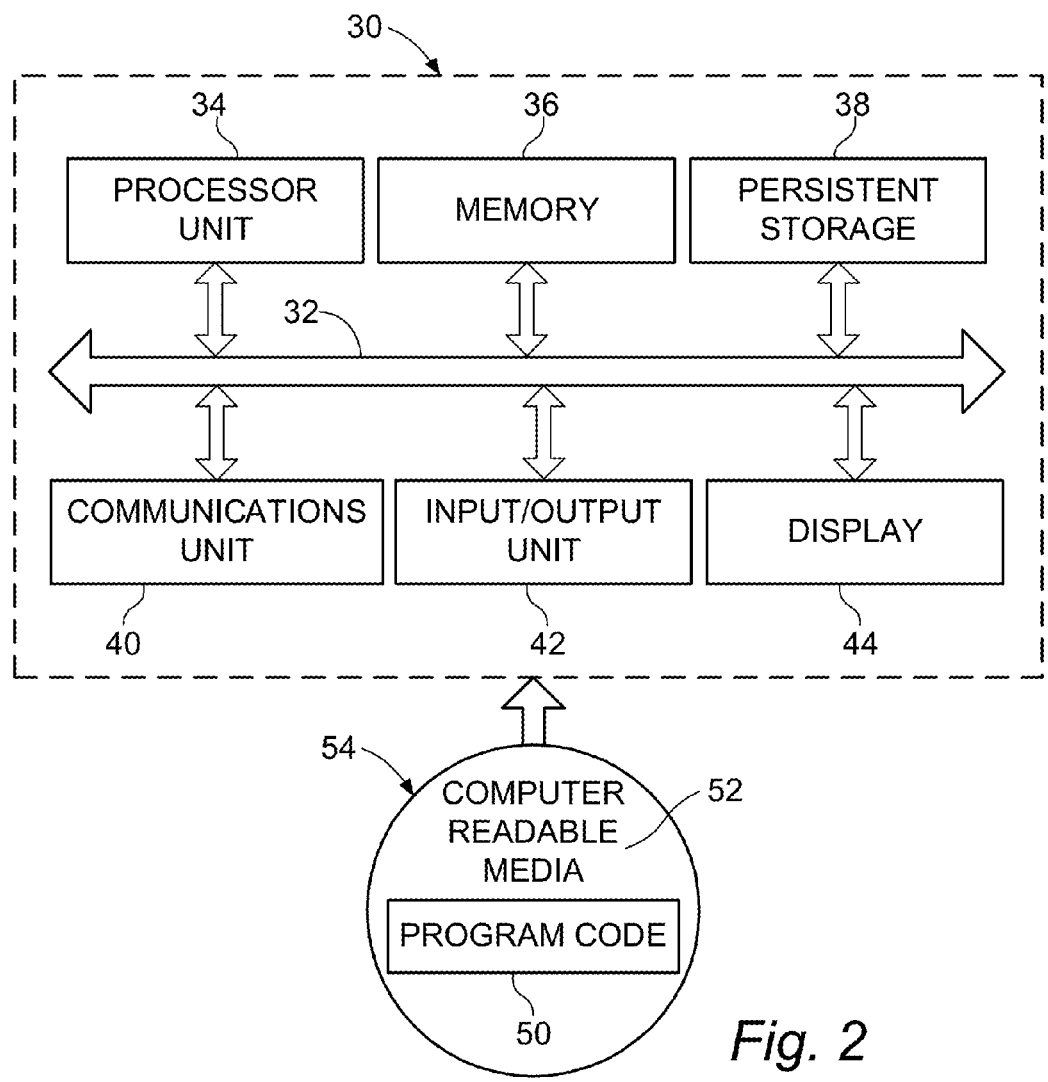
FIG. 2 is a block diagram of an example of a computer in which illustrative embodiments may be implemented.

With reference now to the figures and in particular to FIGS. 1 and 2, exemplary diagrams of data processing environments are provided in which illustrative embodiments may be implemented. It should be appreciated that FIGS. 1 and 2 are only exemplary and are not intended to assert or imply any limitation with regard to the environments in which different embodiments may be implemented. Many modifications to the depicted environments may be made.

The flowcharts and block diagrams in the figures illustrate the architecture, functionality, and operation of possible implementations of systems, methods and computer program products according to various embodiments of the present inventions. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

FIG. 1 depicts a computer system, indicated generally at 10, and including a network of computers in which illustrative embodiments may be implemented. Computer system 10 may contain a network 12, which is the medium used to provide communications links between various devices and computers connected together within computer system 10. Network 12 may include connections, such as wire, wireless communication links, or fiber optic cables, or combinations of such connections.

In the depicted example, a server 14 and a server 16 may connect to network 12 along with a storage unit 18. In addition, one or more client computers may connect to network 12, such as a first client computer 20, a second client computer 22, and a third client computer 24. Client computers 20, 22, and 24 may be, for example, personal computers work stations, or network computers. In the depicted example, server 14 may provide data, such as boot files, operating system images, and/or software applications to client computers 20, 22, and 24. Client computers 20, 22, and 24 are clients to server 14 in this example. Computer system 10 may include additional servers, clients, and other devices not shown, or may include fewer devices than those shown.

In the depicted example, network 12 may be or may include the Internet. Computer system 10 also may be implemented with a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of an exemplary data processing system 30 is shown in which illustrative embodiments may be implemented. Data processing system 30 is an example of a computer, such as server 14 or client computer 20 in FIG. 1, in which computer-usable program code or instructions implementing the processes may be located for the illustrative embodiments. In this illustrative example, data processing system 30 may include communications fabric 32, which provides communications between a processor unit 34, a memory 36, a persistent storage 38, a communications unit 40, an input/output (I/O) unit 42, and a display 44. In other examples, a data processing system may include more or fewer devices.

Processor unit 34, also referred to simply as a processor, may serve to execute instructions for software that may be loaded into memory 36 from persistent storage 38. Processor unit 34 may be a set of one or more processors or may be a multi-processor core, depending on the particular implementation. Further, processor unit 34 may be implemented using one or more heterogeneous processor systems in which a main processor is present with secondary processors on a single chip. As another illustrative example, processor unit 34 may be a symmetric multi-processor system containing multiple processors of the same type.

Memory 36 and persistent storage 38 are examples of storage devices. A storage device is any piece of hardware that is capable of storing information either on a temporary basis and/or a permanent basis. Memory 36, in these examples, may be, for example, a random access memory or any other suitable volatile or non-volatile storage device. Persistent storage 38 may take various forms depending on the particular implementation. For example, persistent storage 38 may contain one or more components or devices. For example, persistent storage 38 may be a hard drive, a flash memory, a rewritable optical disk, a rewritable magnetic tape, or some combination of the above. The media used by persistent storage 38 also may be removable. For example, a removable hard drive may be used for persistent storage 38.

Communications unit 40, in these examples, provides for communications with other data processing systems or devices. For example, communications unit 40 may be a network interface card. Communications unit 40 may provide communications through the use of either or both physical and wireless communications links.

Input/output unit 42 allows for input and output of data with other devices that may be connected to data processing system 30. For example, input/output unit 42 may provide a connection for user input through a keyboard and mouse. Further, input/output unit 42 may send output to a printer. Display 44 displays information to a user.

Instructions for the operating system and applications or programs are located on persistent storage 38. These instructions may be loaded into memory 36 for execution by processor unit 34. The processes of the different embodiments may be performed by processor unit 34 using computer implemented instructions, which may be located in a memory, such as memory 36. These instructions are referred to as program code, computer-usable program code, or computer-readable program code that may be read and executed by a processor in processor unit 34. The program code in the different embodiments may be embodied on different physical or tangible computer-readable media, such as memory 36 or persistent storage 38.

Program code 50 may be located in a functional form on a computer-readable media 52 that is resident on a local or remote storage device or is selectively removable and may be loaded onto or transferred to data processing system 30 for execution by processor unit 34. Program code 50 and computer-readable media 52 form computer program product 54 in these examples. In one example, computer-readable media 52 may be in a tangible form, such as, for example, an optical or magnetic disc that is inserted or placed into a drive or other device that is part of persistent storage 38 for transfer onto a storage device, such as a hard drive that is part of persistent storage 38. In a tangible form, computer-readable media 52 also may take the form of a persistent storage, such as a hard drive, a thumb drive, or a flash memory that is connected to data processing system 30. The tangible form of computer-readable media 52 is also referred to as computer-recordable storage media. In some instances, computer-recordable media 52 may not be removable.

Alternatively, program code 50 may be transferred to data processing system 30 from computer-readable media 52 through a communications link to communications unit 40 and/or through a connection to input/output unit 42. The communications link and/or the connection may be physical or wireless, or a combination of physical and wireless in the illustrative examples. The computer-readable media also may take the form of non-tangible media, such as communications links or wireless transmissions containing the program code.

The different components illustrated for data processing system 30 are not meant to provide architectural limitations to the manner in which different embodiments may be implemented. The different illustrative embodiments may be implemented in a data processing system including components in addition to or in place of those illustrated for data processing system 30. Other components shown in FIG. 2 can be varied from the illustrative examples shown. As one example, a storage device in data processing system 30 is any hardware apparatus that may store data. Memory 36, persistent storage 38, and computer-readable media 52 are examples of storage devices in tangible forms.

In another example, a bus system may be used to implement communications fabric 32 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 36 or a cache such as found in an interface and memory controller hub that maybe present in communications fabric 32.

Figure 3:
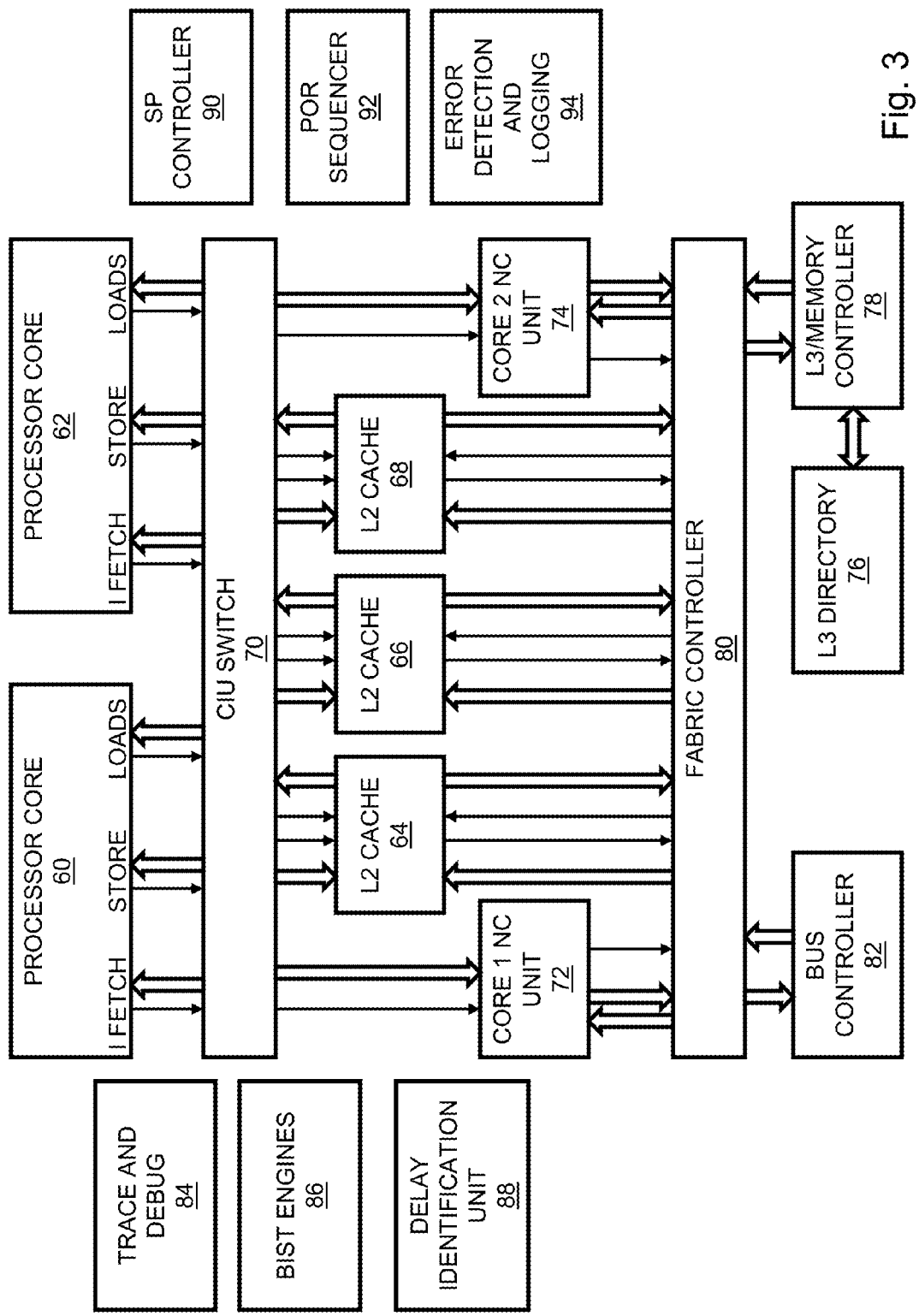
FIG. 3 is a block diagram of an example of a processor unit in which illustrative embodiments may be implemented.

With reference now to FIG. 3, an illustrative example of processor unit 34 is depicted. The processor unit may include two or more processor cores, such as processor cores 60 and 62. Processor cores 60 and 62 may share a unified second-level cache system depicted as L2 (level 2) caches 64, 66, and 68, through a core interface unit (CIU) 70. CIU 70 may be a crossbar switch between L2 caches 64, 66, and 68 (each of which may be implemented as a separate, autonomous cache controller) and processor cores 60 and 62. Each of L2 caches 64, 66, and 68 may operate concurrently and feed multiple bytes of data per cycle. CIU 70 may connect each of the L2 caches to either a L1 (level 1) data cache (such as D-cache 112 in FIG. 4) or a L1 instruction cache (such as I-cache 116 in FIG. 4) in either of processor cores 60 and 62. Additionally, CIU 70 may accept stores from the processor cores across multiple-byte-wide buses and sequence them to L2 caches 64, 66, and 68. Each of processor cores 60 and 62 may have associated with it a non-cacheable (NC) unit, such as NC units 72 and 74, responsible for handling instruction-serializing functions and performing any non-cacheable operations in the storage hierarchy. Conceptually, NC units 72 and 74 may form part of the L2 cache system that includes L2 caches 64, 66, and 68.

Processor unit 34 also may include an L3 (level 3) directory 76 for an L3 cache and an associated L3 controller 78. The actual L3 cache may reside onboard processor unit 34, or on separate chip(s). A separate functional unit, referred to as a fabric controller 80, may be responsible for controlling data flow among L2 caches 64, 66, and 68, NC units 72 and 74, and L3 controller 78. Fabric controller 80 also may control input/output (I/O) data flow to other processor units and/or other I/O devices (not shown) via bus controller 82.

Additionally, processor unit 34 may include functions that may sometimes be referred to as "pervasive functions." Those functions may include a trace and debug facility 84 that may be used for first-failure data capture, a built-in self-test (GIST) engine 86, a delay-identification unit (DIU) 88, a service processor (SP) controller 90 used to interface with a service processor (not shown) to control the overall data processing system 30 shown in FIG. 1, a power-on reset (POR) sequencer 92, and/or an error detection and logging circuitry 94.

Figure 4:
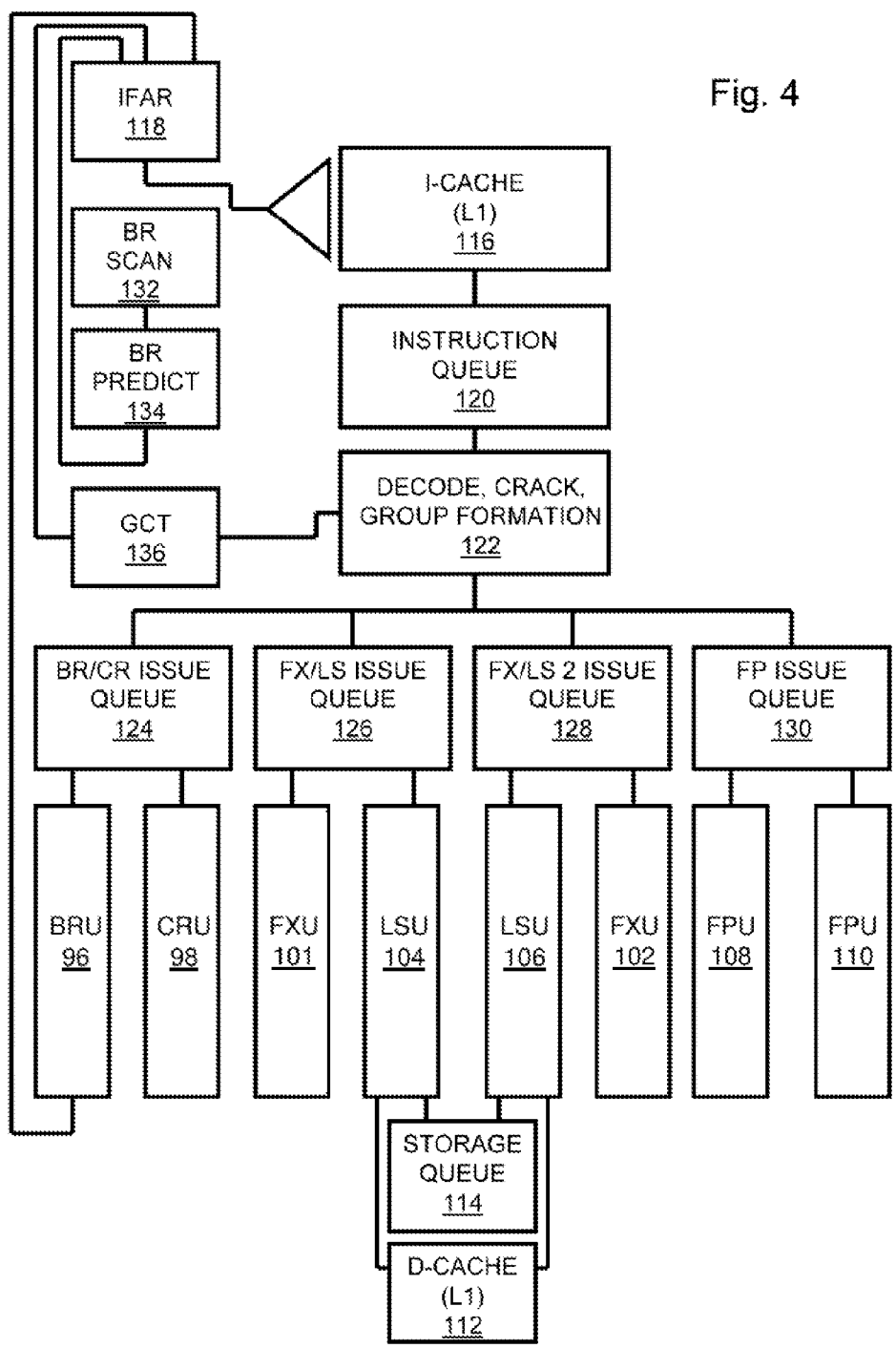
FIG. 4 is a block diagram of an example of a processor core of the processor unit of FIG. 3 in which illustrative embodiments may be implemented.

With reference now to FIG. 4, there is depicted a high-level block diagram of processor core 60 and/or 62 depicted in FIG. 3. Processor cores 60 and 62 shown in FIG. 2 may be on a single chip, identical, and provide a two-way Symmetric Multiprocessing (SMP) computational model to software. Under the SMP model, any idle processor core may be assigned any task, and additional processing units may be added to improve performance and handle increased loads. Although processor cores 60 and 62 are discussed to be on a single chip, identical, and provide a two-way SMP model, the processor cores may alternatively be on separate chips, different, and/or provide other suitable computational model(s).

Processor cores 60 and 62 may have any suitable internal microarchitecture, such as a superscalar design supporting speculative and/or out-of-order execution. In the example shown in FIG. 4, multiple instructions may be issued each cycle and multiple instruction results may be generated at each cycle. In the superscalar architecture, multiple execution units (also may be referred to as "functional units") may be provided to allow multiple instructions to be executed simultaneously.

Each of the execution units may be specialized to execute certain classes of instructions. In FIG. 4, branch (BR) execution unit (BRU) 96 may execute branch instructions, condition register (CR) execution unit (CRU) 98 may execute CR-modifying instructions (or instructions that set or clear condition flags), fixed point (FX) execution units (FXU) 101 and 102 may execute fixed-point instructions, load store execution units (LSU) 104 and 106 may execute load and store instructions, and floating-point (FP) execution units (FPU) 108 and 110 may execute floating-point instructions. The LSUs, each capable of performing address-generation arithmetic, may work with data cache (D-cache) 112 and storage queue 114 to provide data to FP execution units 108 and 110. The above execution units may be configured to execute the instructions (or groups of instructions) based upon cycles of a clock signal of the data processing system.

During the operation of a processor core, instructions that are fetched from the computer's memory system (via L2 cache memory) may be loaded into instruction cache (I-cache) 116 to await execution, according to the instruction-fetch address register (IFAR) 118, which is used to store the address of the next instruction(s) to fetch. Under normal circumstances, the value of IFAR 118 may increase incrementally as non-branch instructions are executed and may be replaced with a new value whenever an unconditional branch instruction is executed. For conditional branches, however, the value of IFAR 118 may be derived through a process of branch prediction, which will be described shortly.

Instructions may be received from I-cache 116 and forwarded to instruction queue 120, which may serve to order the instructions according to the way instructions would be executed in a non-superscalar processor. Decode, crack, and group (DCG) unit 122 may pull instructions from the instruction queue and ready the instructions for execution. More specifically, the DCG unit may perform three functions. First, DCG unit 122 may decode the instructions received from instruction queue 120 to determine the actual operation that the instructions represent. Second, the DCG unit may break down ("crack") the operations into individual instructions, as described above. Third, DCG unit 122 may send the resulting instructions to the appropriate instruction issue queues: BR/CR issue queue 124 for branch instruction instructions and CR-modifying instructions, fixed point/load-store (FX/LD) issue queues 126 and 128 for fixed-point arithmetic/logic instructions and load/store instructions, and floating-point (FP) issue queue 130 for floating point operation instructions.

Branch instructions may be handled through a process of branch prediction, as mentioned above. Branch-prediction scan logic (BR scan) 132 may scan fetched instruction located in I-cache 116 and look for multiple branches each cycle. Depending upon the branch type found, a branch-prediction mechanism denoted as BR predict 134 may be engaged to predict whether the branch will be taken or not (if a conditional branch) and the address to execute next (assuming the previous prediction is correct in the case of a conditional branch). The address prediction may be placed in IFAR 118 to allow speculative fetching of subsequent instructions. Branch instructions flow through I-cache 116, instruction queue 120, DCG unit 122, and BR/CR issue queue 124 until the branch instructions ultimately reach and are executed in BR execution unit 96, where the actual outcomes of the branches may be determined. At that point, if the predictions were found to be correct, the branch instructions may simply be completed as with any other instruction. If a prediction is found to be incorrect, the instruction-fetch logic, including BR scan 132 and BR predict 134, may cause any speculatively fetched instructions that were erroneously fetched due to the incorrect prediction to be discarded and may begin refetching instructions along the corrected control flow.

Instructions may be fetched from I-cache 116 on the basis of the contents of IFAR 118. The IFAR may normally be loaded with an address determined by the branch-prediction logic described above. For cases in which the branch-prediction logic is in error, the branch-execution unit may cause IFAR 118 to be loaded with the corrected address of the instruction stream to be fetched. Additionally, there are other factors that may cause a redirection of the instruction stream, some based on internal events, others on interrupts from external events. In any case, once IFAR 118 is loaded, I-cache 116 may be accessed to retrieve multiple instructions per cycle. The I-cache may be accessed using an I-cache directory (IDIR) (not shown), which is indexed by the effective address of the instruction to provide required real addresses. On an I-cache 116 cache miss, instructions are returned from the L2 cache (such as L2 cache 64 in FIG. 3).

Processor unit 30 may use a translation-lookaside buffer (TLB) and a segment-lookaside buffer (SLB) (neither shown) to translate from the effective address (EA) used by software and the real address (RA) used by hardware to locate instructions and data in storage. The EA, RA pair is stored in a two-way set-associative array, called the effective-to-real address translation (ERAT) table (not shown). Processor unit 30 may implement separate ERATs for instruction-cache (IERAT) and data-cache (DERAT) accesses. Both ERATs may be indexed using the effective address.

As instructions are executed out of order, it is necessary to remember the program order of all instructions in flight. To minimize the logic necessary to track a large number of in-flight instructions, DCG unit 122 may organize instructions into groups. Thus, the DCG unit may sometimes be referred to as an "instruction-grouping unit." The individual groups are tracked through the system. That is, the state of the machine is preserved at group boundaries, not at an instruction boundary within a group. Any exception causes the machine to be restored to the state of the oldest group prior to the exception.

A group may contain multiple instructions. In a preferred embodiment, DCG unit 122 may place instructions sequentially in a group—the first instruction (in program order) is placed in slot 0, the next one in slot 1, and so on. Slot 4 may be reserved solely for branch instructions. If required, NOIs ("no-operation" instructions) may be inserted to force the branch instruction to be in the fourth slot. If there is no branch instruction, slot 4 may contain a NOI. Only one group of instructions is dispatched, i.e., moved into issue queues, in a cycle, and all instructions in a group are dispatched together. Groups are dispatched in program order. Individual instructions are issued from the issue queues to the execution units (out of program order) as the execution units become available.

Results are committed, i.e., released to downstream logic, when the group completes. A group can complete when the group has attained "next-to-complete" (NTC) status and when all instructions in the group have finished execution. A group attains NTC status when all previous groups have completed. Only one group can complete in a cycle.

For correct operation, certain instructions are not allowed to execute speculatively. To ensure that the instruction executes nonspeculatively, the group containing such instruction may not be executed until it has attained NTC status. This mechanism is called completion serialization. To simplify the implementation, such instructions form single-instruction groups. Examples of completion serialization instructions include loads and stores to guarded space and context-synchronizing instructions, such as the move-to-machine-state-register instruction that is used to alter the state of the machine.

In order to implement out-of-order execution, many, but not all, of the registers in the processor architecture are renamed. To ensure proper execution of these instructions, any instruction that sets a non-renamed register must terminate a group.

Groups may be dispatched into the issue queues one group at a time. As a group is dispatched, control information for the group may be stored in a group completion table (GCT) 136. The GCT may store information for up to any suitable number of groups, such as 20 groups. The primary information stored in the GCT may include the instructions in the group, each instruction's program order, and each instruction's execution order, which, in a superscalar processor, is often different from the program order. The GCT entry also may contain the address of the first instruction in the group. As instructions finish executing, the results of those instructions may be registered in the GCT entry for the group. Information is maintained in the GCT until the group is retired, i.e., either all of its results are committed, or the group is flushed from the system.

Instructions may be dispatched into the top of an issue queue, such as FP issue queue 130, FX/LD issue queues 126 and 128 and BR/CR issue queue 124. As each instruction is issued from the queue, the remaining instructions move down in the queue. In the case of two queues feeding a common execution unit (not shown), the two queues may be interleaved. The oldest instruction in the common interleaved queue that has all of its sources set (i.e., that has available to it all data needed to execute the instruction) may be issued to the execution unit. Because instruction queue 120, BR/CR issue queue 124, FX/LD issue queues 126 and 128, FP issue queue 130, and/or GCT 136 may order (such as prioritize and/or deprioritize) incoming instructions of a group of incoming instructions prior to execution by one or more execution units of a processor core, one or more of those components may be referred to as a "prioritization unit" or "prioritization units."

Figure 5:
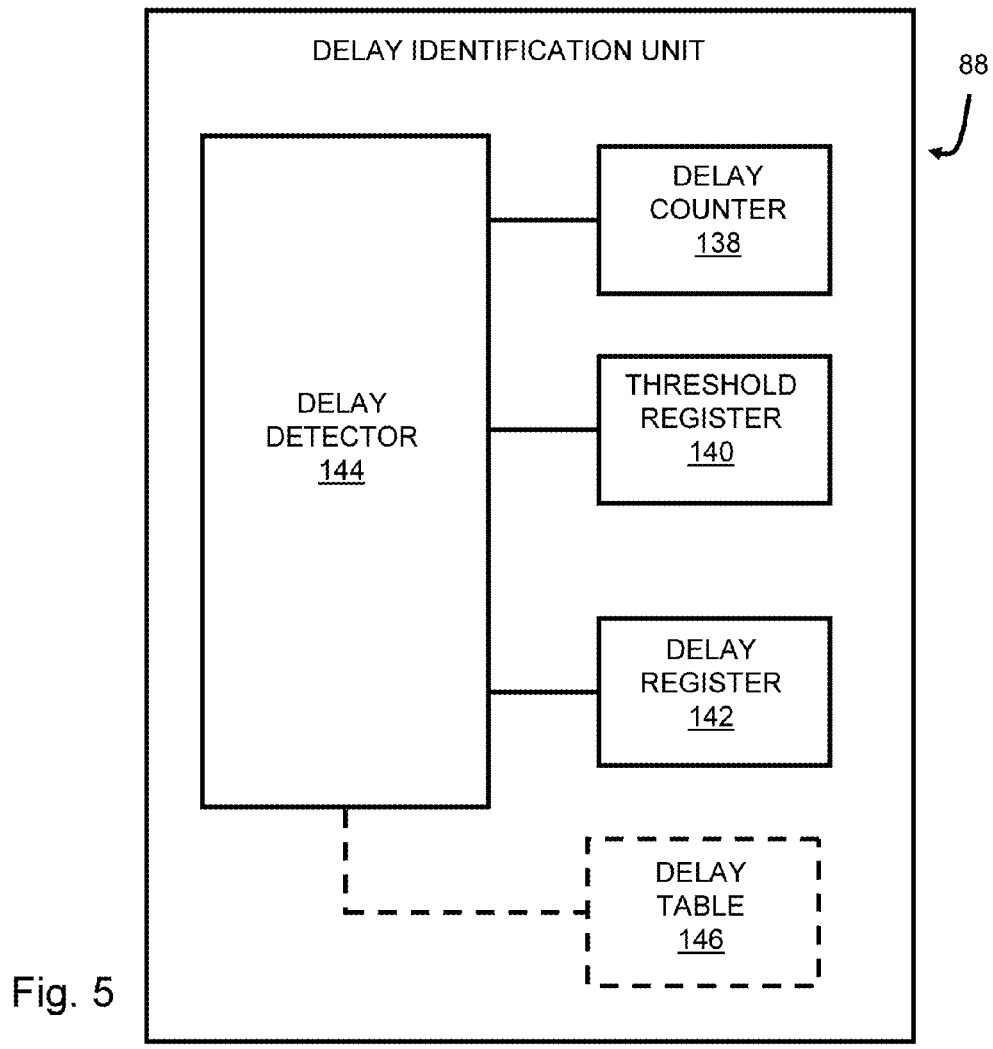
FIG. 5 is a block diagram of an example of a delay-identification unit of the processor core of FIG. 4 in which illustrative embodiments may be implemented.

Referring now to FIG. 5, a block diagram of an illustrative example of delay-identification unit 88 of a processor core is depicted. The delay-identification unit may include any suitable structure configured to identify delays, such as front-end and/or back-end stalls. For example, delay-identification unit 88 may include a delay counter 138, a threshold register 140, a delay register 142, and a delay detector 144.

Delay counter 138 may be configured to count the cycles occurring in a time period between when a group of instructions is ready to be dispatched for execution by one or more execution units of a processor core, and when that group of instructions is completely executed by those execution units. Any suitable delay counter may be used, such as a 16-bit completion counter. The delay counter may sometimes be referred to as a "latency counter" when the delay-identification unit is measuring back-end stalls, and may sometime be referred to as a "pipeline-empty latency counter" when the delay-identification unit is measuring front-end stalls.

Threshold register 140 may be configured to store a threshold number of cycles that represent an undesired amount of delay in a time period between when a group of instructions is ready to be dispatched for execution by one or more execution units of a processor core, and when that group of instructions is completely executed by those execution units. Any suitable threshold register may be used, such as a 16-bit completion register. The register may be programmed by software to provide the threshold number. That threshold number may be changed any suitable number of times by the software. The threshold register may sometimes be referred to as a "latency threshold" when the delay-identification unit is measuring back-end stalls, and may sometime be referred to as an "empty latency threshold" when the delay-identification unit is measuring front-end stalls.

Delay register 142 may be configured to store at least one effective address of one or more instructions of one or more groups of instructions that are being executed by a processor core. Any suitable delay register may be used, such as a special purpose register (SPR).

Delay detector 144 may be configured to detect when a group of instructions is delayed in a time period between when a group of instructions is ready to be dispatched for execution by one or more execution units of a processor core, and when that group of instructions is completely executed by those execution units. Additionally, the delay detector may be configured to start delay counter 138 in response to detecting that a group of instructions is delayed and stop the delay counter in response to detecting that such group of instructions is no longer delayed.

For example, delay detector 144 may start delay counter 138 in response to detecting that a group of instructions is delayed from being completely executed, and stop the delay counter in response to detecting that the execution unit(s) have completely executed that group of instructions. The delay detector may, for example, detect when a group of instructions has attained NTC status but has not attained completed status after any suitable number cycles of attaining NTC status, such as one or more cycles. Additionally, delay detector 144 may be configured to start delay counter 138 in response to detecting that a group of instructions has attained NTC status but has not attained completed status after any suitable number of cycles of attaining the NTC status, such as one or more cycles. The delay detector may be designed to start the delay counter after a fixed number of cycles. Additionally, software may set the number of cycles after which the delay detector will start the delay counter.

In some embodiments, delay detector 144 may be configured to detect an oldest instruction in a group of instructions that has attained NTC status but has not attained completed status after any suitable number of cycles of attaining the NTC status. The oldest instruction may be an instruction in a group of instructions that one or more execution units of a processor core (1) began executing before all other uncompleted instructions in that group and/or (2) have not yet completed executing. Additionally, the delay detector may stop delay counter 138 when the oldest instruction is completely executed. In some embodiments, the delay detector may be configured to ignore one or more instructions that are completely executed prior to the instructions (or the group that includes those instructions) attaining NTC status.

Additionally, the delay detector may start delay counter 138 in response to detecting that a group of instructions is delayed from being dispatched to one or more execution units, and stop the delay counter in response to detecting the dispatch of that group of instructions. For example, delay detector 144 may be configured to detect when GCT 136 is empty. Additionally, the delay detector may be configured to start delay counter 138 when the GCT is empty for any suitable number of cycles, such as one or more cycles, and/or stop the delay counter when the GCT is no longer empty.

Additionally, delay detector 144 may be configured to compare number of cycles counted by delay counter 138 with a threshold number of cycles stored in the threshold register. When the counted number of cycles is greater than the threshold number of cycles, the delay detector may be configured to store at least one effective address of one or more of the instructions of the group of instructions. In contrast, when the counted number of cycles is less than and/or equal to the threshold number of cycles, delay detector 144 may be configured to reset delay counter 138.

In some embodiments, the delay detector may store one or more effective addresses of an oldest instruction from the group of instructions. After storing those effective addresses, the delay detector may reset the delay counter and continue to detect if the same group of instructions is delayed from being dispatched and/or completed, such as detecting a next oldest instruction in the same group of instructions, and/or a different group of instructions that is delayed from being dispatched and/or completed.

In some embodiments, DIU 88 may include a delay table 148 configured to store delay data regarding one or more groups of instructions. For example, delay detector 144 may be configured to store one or more of the following in the delay table: (1) number of cycles counted by delay counter 138, (2) threshold number of cycles stored in threshold register 140, and (3) one or more effective addresses of one or more instructions.

Figure 6:
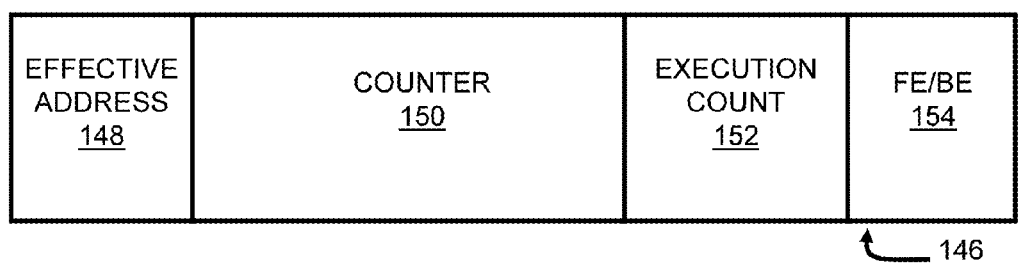
FIG. 6 is an example of a delay table of the delay-identification unit of FIG. 5 in which illustrative embodiments may be implemented.

Referring now to FIG. 6, an example of delay table 148 is shown. The delay table may include an Effective Address column 148, a Counter column 150, an Execution Count column 152, and a FE/BE column 154. The Effective Address column may store the effective address(es) of instruction(s), and/or a hash of those address(es). The Counter column may store counts of the delay associated with the instructions, while the Execution Count column may store execution counts of the delay associated with those instructions. For example, the counter column may include a 32-bit cumulative counter that is incremented each time a delay (or undesired delay) is encountered. The FE/BE column may indicate whether the delays are front-end (FE) stalls or back-end (BE) stalls. Delay detector 144 may populate the delay table any suitable times, such as when the number of cycles counted by the delay counter is greater than the threshold number of cycles stored in the threshold register, as discussed above. In some embodiments, DIU 88 may include both delay register 142 and delay table 146, or may include only one or the other.

In some embodiments, one or more of the prioritization units of a processor core may be configured to read delay table 146 and identify from a group of incoming instructions whether one or more instructions from that group have previously caused a delay, such as a delay with an associated cycle count that is greater than the threshold number of cycles stored in the threshold register. The prioritization unit(s) may then use information from the delay table to better manage instructions that have previously caused delays (or undesired delays), such as during ordering and/or prioritization of incoming instructions of a group of incoming instructions.

The prioritization unit(s) may, for example, decrease priority of the instructions, fetch (or prefetch) data and/or instruction(s) needed to avoid and/or reduce delays when executing the instructions, increase priority of the instructions, flush the instructions, and/or other suitable actions. For example, if an instruction address suffers from frequent completion stalls to cache misses (e.g., sensitive to cache misses), then when the CIU switch detects the instruction address at dispatch, it may encode a priority for the load miss to one or more of the L2 caches so that the fabric controller and L3 memory controller may prioritize requests associated with the instruction address.

In some embodiments, one or more of the execution units of a processor core may be configured to operate at a plurality of operating frequencies based on whether instructions are delayed. For example, one or more of the execution units may be configured to operate at a first frequency when those units are executing a group of instructions that does not include a delay in a time period between when the one group of instructions is ready to be dispatched for execution and when the group of instructions is completely executed by the execution unit(s). Additionally, the execution unit(s) may be configured to operate at a second frequency lower than the first frequency (e.g., a frequency reduction) when the group of instructions includes a delay in the time period between when the group of instructions is ready to be dispatched for execution and when the group of instructions is completely executed by the execution unit(s). The execution unit(s) and/or other components may communicate with DIU 88 to determine the optimal and/or suitable frequency (or frequencies). Alternatively, the DIU may communicate with the execution unit(s) based on detecting delays and/or anticipating delays (such as identifying instructions that have previously caused delays stored in delay register 142 and/or delay table 146).

Figure 7:
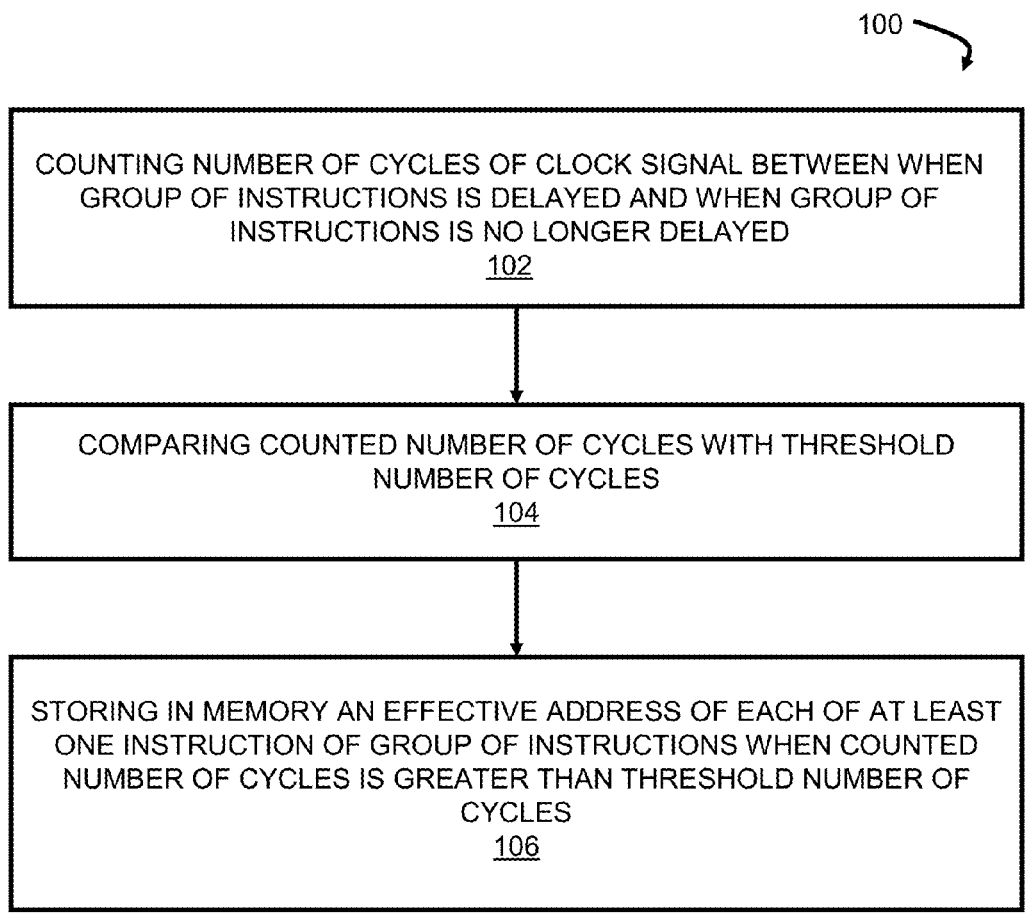
FIG. 7 shows a flowchart illustrating an example of a method of identifying delays in a processor unit in accordance with the principles of the present inventions.

Referring now to FIG. 7, an example of a method 100 of identifying delays in a computer processor is shown. While FIG. 7 shows illustrative steps of a method according to one embodiment, other embodiments may omit, add to, and/or modify any of the steps shown in that figure. In step 102, a number of cycles of a clock signal may be counted between when a group of instructions is delayed and when the group of instructions is no longer delayed. For example, a number of cycles of a clock signal may be counted between (1) when the group of instructions is delayed in a time period between when the group of instructions is ready to be dispatched for execution by execution unit(s) of the computer processor, and when the group of instructions is completely executed by those units, and (2) when the group of instructions is no longer delayed in the time period.

In some embodiments, step 102 may include counting a number of cycles between (a) when the group of instructions is delayed from being completely executed, and (b) when the group of instructions is completely executed by execution unit(s) of the computer processor. For example, a number of cycles may be counted between (i) when the group of instructions has attained NTC status but has not attained completed status after one or more cycles of attaining NTC status, and (ii) when an oldest instruction of the group of instructions has been completely executed by the execution unit(s). In some embodiments, step 102 may include counting a number of cycles between (1) when the group of instructions is delayed from being dispatched to execution unit(s) of the computer processor, and (2) when the group of instructions is dispatched to those units.

In step 104, the counted number of cycles may be compared with a threshold number of cycles. In step 106, an effective address of each of at least one instruction of the group of instructions may be stored, such as in memory, when the counted number of cycles is greater than the threshold number of cycles.

Method 100 may include additional steps. For example, method 100 may include decreasing priority of instruction(s) in the group of instructions, fetching (or prefetching) data and/or instruction(s) in the group to avoid and/or reduce delays when executing the instructions, increasing priority of the instruction(s), and/or flushing the instruction(s). Those steps may, for example, occur when the counted number of cycles is greater than the threshold number of cycles. Any suitable structure may perform one or more of the above steps, such as DIU 88 and/or other components described above.

The terminology used herein is for the purpose of describing particular embodiments only and is not intended to be limiting of the described inventions. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present inventions has been presented for purposes of illustration and description, but is not intended to be exhaustive or limited to the inventions in the form disclosed. For example, the invention may be embodied in an environment that is not part of a revision control system. Many modifications and variations will be apparent to those of ordinary skill in the art without departing from the scope and spirit of the inventions. The embodiments were chosen and described in order to best explain the principles of the inventions and the practical application, and to enable others of ordinary skill in the art to understand the inventions for various embodiments with various modifications as are suited to the particular use contemplated.

What is claimed is:

1. An apparatus, comprising:
   an instruction-grouping circuit configured to organize a plurality of instructions for a computer processor into a plurality of instruction groups prior to execution;
   a plurality of execution units configured to execute the plurality of instruction groups based upon cycles of a clock signal;
   a delay-identification circuit including:
      a delay counter that is configured to count a number of cycles occurring in a time period for a first group of instructions of the plurality of instruction groups, wherein the time period is an amount of time between when a group of instructions is ready to be dispatched to one or more execution units of the plurality of execution units and when the group of instructions has been completely executed by the one or more execution units;
      a threshold register that is configured to store a threshold number of cycles that represents an undesired amount of delay within the time period;
      a delay register that is configured to store at least one effective address of at least one instruction in the first group of instructions;
      a delay detector circuit that is configured to:
         detect when the first group of instructions is delayed in the time period;
         in response to detecting that the first group of instructions is delayed, start the delay counter to count the number of cycles in the time period;
         in response to detecting that the first group of instructions is no longer delayed, stop the delay counter;
         compare the number of cycles counted with the threshold number of cycles; and in response to determining the number of cycles counted is greater than the threshold number of cycles, store at least one effective address of at least one instruction of the first group of instructions; and a group completion table that is configured to store data regarding the first group of instructions when the first group of instructions has been dispatched to the one or more execution units but has not been at least one of: completely executed by the one or more execution units and flushed from the apparatus;

wherein the delay detector circuit is further configured to:
detect when the first group of instructions is delayed from being dispatched to the one or more execution units; and
detect when the group completion table is empty for one or more cycles; and wherein the delay-identification circuit communicates a frequency, from among at least a first frequency and a second frequency, for processing the first group of instructions via the one or more execution units in response to anticipating a delay in the first group of instructions.

2. The apparatus of claim 1, wherein the delay detector circuit is further configured to:
reset the delay counter when the number of cycles counted by the delay counter is not greater than the threshold number of cycles;
detect when the first group of instructions is delayed from being completely executed by the one or more execution units;
detect when the first group of instructions has attained a next-to-complete status; and
in response to detecting that the first group of instructions has not attained a completed status within a number of cycles of attaining the next-to-complete status:
detect an oldest instruction in the one or more execution units that has not yet completed execution, wherein execution of the oldest instruction by one of the one or more execution units began before all other uncompleted instructions;
start the delay counter to count a number of cycles of the oldest instruction; and
stop the delay counter when execution of the oldest instruction completes.

3. The apparatus of claim 2, wherein the delay detector circuit is further configured to, in response to detecting that the first group of instructions has not attained a completed status within a number of cycles of attaining the next-to-complete status:
detect when the number of cycles of the oldest instruction is greater than the threshold number of cycles;
in response to detecting the number of cycles of the oldest instruction is greater than the threshold number of cycles, store one effective address of the oldest instruction; and
in response to execution of the oldest instruction completing:
reset the delay counter; and
detect, a next oldest instruction in the first group of instructions that has not yet completed execution, wherein execution of the next oldest instruction by one of the one or more execution units began before all other uncompleted instructions.

4. The apparatus of claim 1, wherein the delay detector circuit is further configured to:

in response to detecting the group completion table is empty for the one or more cycles, start the delay counter.

5. The apparatus of claim 4, wherein the delay detector circuit is further configured to:
in response to detecting the group completion table is no longer empty, stop the delay counter.

6. The apparatus of claim 1, further comprising:
a delay table that is configured to store data regarding the first group of instructions;
wherein the delay detector circuit is further configured to store, in the delay table, the number of cycles, the threshold number of cycles, and the at least one effective address.

7. The apparatus of claim 6, further comprising:
a prioritization circuit that is configured to:
order a group of incoming instructions prior to execution by the one or more execution units;
read the delay table;
identify, within the group of incoming instructions, one or more instructions that are identified within the delay table as previously causing a delay having an associated cycle count that is greater than the threshold number of cycles;
decrease a priority of the identified one or more instructions;
fetch data needed to avoid the delay when executing the identified one or more instructions; and
in response to fetching data needed to avoid the delay, increase the priority of the identified one or more instructions.

8. The apparatus of claim 6, further comprising a prioritization circuit that is configured to:
order a group of incoming instructions prior to execution;
read the delay table;
identify, within the group of incoming instructions, one or more instructions that are identified within the delay table as previously causing a delay having an associated cycle count that is greater than the threshold number of cycles; and
in response to identifying the one or more instructions, flush the identified one or more instructions from the apparatus.

9. The apparatus of claim 1, wherein the plurality of execution units are configured to operate at the first frequency when the first group of instructions does not include a delay in the time period, and the second frequency that is lower than the first frequency when the first group of instructions includes a delay in the time period.

10. A method, comprising:
in response to anticipating a delay in a group of instructions, communicating a frequency by a delay-identifying apparatus from among at least a first frequency and a second frequency, for processing the group of instructions via one or more execution units;
counting, by the delay-identifying apparatus, a number of cycles of a clock signal occurring in a time period in which the group of instructions is delayed, wherein the time period is the amount of time between when the group of instructions is ready to be dispatched for execution by the one or more execution units and when the group of instructions is completely executed by the one or more execution units and is thus no longer delayed;
detecting when the group of instructions is delayed in the time period;
comparing, by the delay-identifying apparatus, the counted number of cycles with a threshold number of cycles, wherein the threshold number of cycles represents an undesired amount of delay within the time period;

in response to determining the counted number of cycles is greater than the threshold number of cycles, storing, in a memory, an effective address of each instruction of the group of instructions;

detecting when the group of instructions is delayed from being dispatched to the one or more execution units;

storing, to a group completion table, data regarding the group of instructions when the group of instructions has been dispatched to the one or more execution units but has not been at least one of: completely executed by the one or more execution units and flushed from the apparatus;

detecting when the group completion table is empty for one or more cycles;

in response to detecting the group completion table is empty for the one or more cycles, starting a delay counter; and in response to detecting the group completion table is no longer empty, stopping the delay counter.

11. The method of claim 10, further comprising:

counting a second number of cycles between when the group of instructions is delayed from being completely executed and when the group of instructions is completely executed by the one or more execution units;

counting a third number of cycles between when the group of instructions has attained a next-to-complete status but has not yet attained a completed status and when an oldest instruction of the group of instructions has been completely executed by one of the one or more execution units; and counting a fourth number of cycles between when the group of instructions is delayed from being dispatched to the one or more execution units and when the group of instructions is dispatched to the one or more execution units.

12. The method of claim 10, further comprising:

storing, to a delay table for the group of instructions, data regarding the number of cycles, the threshold number of cycles, and at least one effective address; and ordering a group of incoming instructions prior to execution, the ordering of the group of incoming instructions further comprising:

reading a delay table;

identifying, within the group of incoming instructions, one or more instructions that are identified within the delay table as previously causing a delay having an associated cycle count that is greater than the threshold number of cycles;

decreasing a priority of the identified one or more instructions;

fetching data needed to avoid the delay when executing the identified one or more instructions; and in response to fetching data needed to avoid the delay, increasing the priority of the identified one or more instructions.

13. The method of claim 10, further comprising:

storing, to a delay table for the group of instructions, data regarding the number of cycles, the threshold number of cycles, and at least one effective address; and ordering a group of incoming instructions prior to execution, the ordering of the group of incoming instructions further comprising:

reading a delay table;

identifying, within the group of incoming instructions, one or more instructions that are identified within the delay table as previously causing a delay having an associated cycle count that is greater than the threshold number of cycles; and in response to identifying the one or more instructions, flushing the identified one or more instructions from the delay-identifying apparatus.

14. A computer program product for identifying delays in a first computer processor having one or more execution units, the computer program product comprising at least one non-transitory computer readable storage medium having computer readable program instructions embodied therein that when executed by a second computer processor, enables the second computer processor to:

in response to anticipating a delay in a group of monitored program instructions, communicate a frequency, from among at least a first frequency and a second frequency, for processing the group of monitored program instructions via the one or more execution units;

count a number of cycles of a clock signal occurring in a time period in which the group of monitored program instructions is delayed, wherein the time period is an amount of time between when the group of monitored program instructions is ready to be dispatched for execution by the one or more execution units and when the group of monitored program instructions is completely executed by the one or more execution units, thus no longer delayed;

detect when the group of monitored program instructions is delayed in the time period;

compare the counted number of cycles with a threshold number of cycles, wherein the threshold number of cycles represents an undesired amount of delay within the time period;

in response to determining the counted number of cycles is greater than the threshold number of cycles, store, in a memory, an effective address of each instruction of the group of monitored program instructions;

detect when the group of monitored program instructions is delayed from being dispatched to the one or more execution units;

store, to a group completion table, data regarding the group of monitored program instructions when the group of monitored program instructions has been dispatched to the one or more execution units but has not been at least one of: completely executed by the one or more execution units and flushed from the apparatus;

detect when the group completion table is empty for one or more cycles;

in response to detecting the group completion table is empty for the one or more cycles, start a delay counter; and in response to detecting the group completion table is no longer empty, stop the delay counter.

15. The computer program product of claim 14, the computer readable program instructions further comprising instructions that enable the second computer processor to:

count a second number of cycles between when the group of monitored program instructions is delayed from being completely executed and when the group of monitored program instructions is completely executed by the one or more execution units;

count a third number of cycles between when the group of monitored program instructions has attained a next-to-complete status but has not yet attained a completed status and when an oldest instruction of the group of monitored program instructions has been completely executed by one of the one or more execution units; and count a fourth number of cycles between when the group of monitored program instructions is delayed from being dispatched to the one or more execution units and when the group of monitored program instructions is dispatched to the one or more execution units.

16. The computer program product of claim 14, the computer readable program instructions further comprising instructions that enable the second computer processor to:

store, to a delay table for the group of monitored program instructions, data regarding the number of cycles, the threshold number of cycles, and at least one effective address; and order a group of incoming instructions prior to execution, the ordering of the group of incoming instructions further comprising:

read the delay table;

identify, within the group of incoming instructions, one or more instructions that are identified within the delay table as previously causing a delay having an associated cycle count that is greater than the threshold number of cycles;

decrease a priority of the identified one or more instructions;

fetch data needed to avoid the delay when executing the identified one or more instructions; and in response to fetching data needed to avoid the delay, increase the priority of the identified one or more instructions.

17. The computer program product of claim 14, the computer readable program instructions further comprising instructions that enable the second computer processor to:

store, to a delay table for the group of monitored program instructions, data regarding the number of cycles, the threshold number of cycles, and at least one effective address; and order a group of incoming instructions prior to execution, the ordering of the group of incoming instructions further comprising:

read the delay table;

identify, within the group of incoming instructions, one or more instructions that are identified within the delay table as previously causing a delay having an associated cycle count that is greater than the threshold number of cycles; and in response to identifying the one or more instructions, flush the identified one or more instructions from the first computer processor.

* * * * *